May 25, 1926.
J. N. NELSON
SPECTACLE TEMPLE
Original Filed May 9, 1924
1,586,109
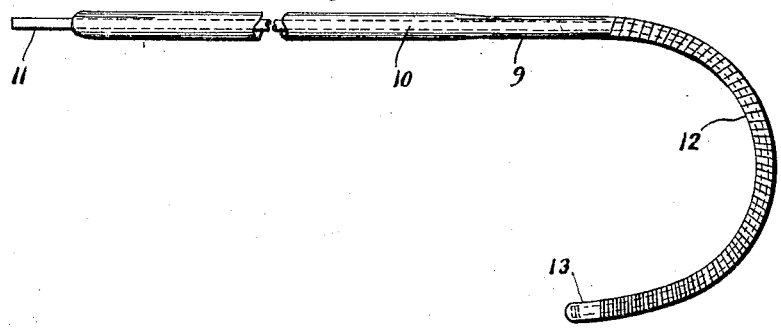
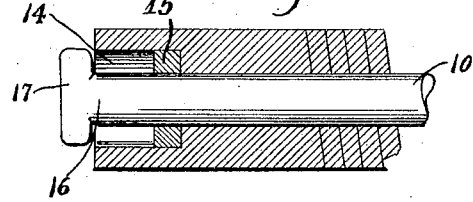
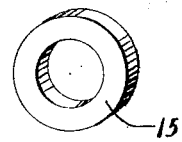
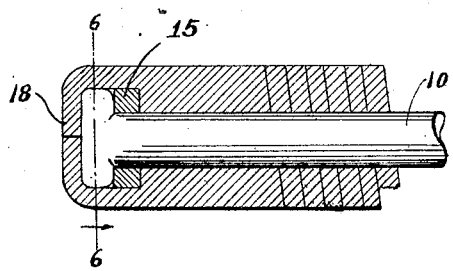
Inventor
John N. Nelson
By Barlow & Barlow
Attorneys Patented May 25, 1926.

1,586,109

UNITED STATES PATENT OFFICE.

JOHN N. NELSON, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND.

SPECTACLE TEMPLE.

Application filed May 9, 1924, Serial No. 712,007. Renewed April 15, 1926.

This invention relates to an improved construction of temple, and method of forming the same; and the object of this invention is to provide a spectacle temple formed of wire having a non-metallic covering, the ear-engaging portion of the covering being in a helical form.

A further object of this invention is to provide the temple wire covering with a non-metallic tube and to cut the curved ear-engaging portion of the tube helically, the pitch of the helix being gradually reduced towards the end of the temple to correspondingly increase its flexibility.

A still further object of the invention is to counterbore the end of the tube, seat a washer in the counterbore, extend the end of the temple wire through the washer and enlarge this end to seat against the washer for the purpose of locking the tube in the wire and the convolutions of the helical portion of the tube in compressed or contiguous arrangement.

With these and other objects in view, the invention consists of certain novel features of construction, as will be more fully described, and particularly pointed out in the appended claims.

In the accompanying drawings:—

Figure 1 is a side elevation of my improved temple showing the ear-engaging portion of the casing in helical form.

Figure 2 is a view showing the shank portion of the wire core of the temple as roughened or corrugated to prevent the tube from slipping on the wire.

Figure 3 is an enlarged view showing an end of the temple tube as counterbored and a washer seated in the counterbore, also showing the end of the wire core flattened or enlarged to seat against the washer.

Figure 4 is a perspective view of the washer.

Figure 5 is a view showing the wire core as withdrawn back into the non-metallic tubing, the end of the tubing being rolled over to enclose the washer and the enlarged end of the wire.

Figure 6 is a section on line 6—6 of Figure 5, showing the flattened shape of the enlarged head of the wire.

It is found in practice in the use of temples, of advantage to form the ear-engaging portion from flexible material so as not to abrade or irritate the tender flesh behind the ear, and to increase the flexibility of the temple when formed of wire covered with a non-metallic tube, and to accomplish this I have cut or formed the ear-engaging portion of this tubing into a helix thereby rendering it extremely yieldable and flexible and in some instances I graduate or gradually decrease the pitch of the helix towards the end of the temple to correspondingly increase the flexibility and I have also provided improved securing means for locking the tube on the wire and the convolutions of the helix in compressed or contiguous relation, so that the spaces normally formed by the cutting of the tube will be closed to render the engaging surface smooth and at the same time obtain increased flexibility of the temple; and the following is a detailed description of one means by which these advantageous results may be obtained:—

With reference to the drawings, 10 designates the core of the temple which may be made of wire, on one end of which is formed the usual attaching enlargement 11 by which the temple is secured to the spectacle frame. The opposite end portion of the temple being preferably rounded into somewhat of a semi-circular form as at 12.

Where it is desired to cover temples of this character with a non-metallic tubing 9, the tubing ordinarily serves to stiffen the ear-engaging portion of the wire and to obviate this stiffening effect, I have cut this ear-engaging portion of the tubing helically or in helical form which renders it extremely flexible, and in order to increase the flexibility towards its end, I, in some cases, gradually decrease the pitch of the cut towards the end of the tube thereby correspondingly increasing the flexibility of the tube.

Near the extremity of the temple, I preferably leave the tube plain or uncut for a short distance as at 13, and in order to secure the end of this tubing to the wire core, I, in some cases, counterbore the end as at 14, see Figure 3, and seat a washer 15 on the shoulder of the counterbore, I then extend the end 16 of the core 10 beyond the end of the tube by straightening out the curve and I then enlarge or spread this end of this core as at 17, preferably by a swaging operation. Then upon releasing the wire it naturally returns to its curved position and this enlarged end is drawn inwardly to seat against the washer, thereby providing a strong and and durable locking means which serves first to lock the tube on the wire and second, to compress the convolutions of the helix into contiguous relation to eliminate the spaces caused by the cut and provides a mooth, continuous ear-engaging surface of the tube.

In order to render the appearance of this device more finished, I turn the edges 18 of the tube over to incase or cover the washer and this enlarged head.

In some instances, in order to prevent the tube 9 from slipping on the shank portion of the wire, I knurl or roughen the wire as at 19, which roughened portion imbeds itself into the engaging portion of the tube when pressure is applied thereto sufficiently to prevent a relative endways movement of the tube and wire under pressure of the spring of the helical coils.

My improved temple is very simple and practical in construction, is strong and durable and is very flexible on its ear-engaging portion.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A spectacle temple formed of a wire having a non-metallic covering, the ear-engaging portion of the covering being in a helical form, the pitch of the helix being gradually reduced towards the end of the temple.

2. A spectacle temple having a core with a shank portion and an ear-engaging portion, a non-metallic covering for said core, said covering at the ear-engaging portion being cut in helical form with a gradually decreasing pitch to progressively increase its yieldability.

3. A spectacle temple having a metallic core with a shank portion and an ear-engaging portion, an un-cut covering for said shank portion and a covering helically cut for said ear portion, said helical cut extending from said shank with a gradually decreasing pitch to progressively increase its flexibility.

4. A method of forming a spectacle temple, which consists in providing a temple wire, helically cutting the ear engaging portion of a length of non-metallic tubular covering for the wire with a gradually changing pitch, and inserting and securing the wire in the tube.

In testimony whereof I affix my signature.

JOHN N. NELSON.